US012788650B2

(12) United States Patent
Van Dorn

(10) Patent No.: US 12,788,650 B2
(45) Date of Patent: Nov. 10, 2026

(54) SYSTEMS AND METHODS FOR DETECTING FALLS USING ROTATION-BASED SENSING

(71) Applicant: PIP Manufacturing, Inc., Latham, NY (US)

(72) Inventor: Carolyn Van Dorn, Crystal, MN (US)

(73) Assignee: PIP Manufacturing, Inc., Latham, NY (US)

( * ) Notice: Subject to any disclaimer, the term of this patent is extended or adjusted under 35 U.S.C. 154(b) by 0 days.

(21) Appl. No.: 18/781,359

(22) Filed: Jul. 23, 2024

(65) Prior Publication Data

US 2026/0026760 A1 Jan. 29, 2026

(51) Int. Cl.

| | |
|---|---|
| ***A61G 7/05*** | (2006.01) |
| ***A61G 7/00*** | (2006.01) |
| ***A61G 7/015*** | (2006.01) |
| ***A61G 7/053*** | (2006.01) |
| *G08B 21/02* | (2006.01) |
| *G08B 21/18* | (2006.01) |

(52) U.S. Cl.

CPC ............ *A61G 7/0507* (2013.01); *A61G 7/00* (2013.01); *A61G 7/015* (2013.01); *A61G 7/0526* (2013.01); *A61G 7/053* (2013.01); *G08B 21/02* (2013.01); *G08B 21/182* (2013.01)

(58) Field of Classification Search

CPC .......... A61G 7/00; A61G 7/005; A61G 7/012; A61G 7/015; A61G 7/018; A61G 7/05; A61G 7/08; A47C 21/08

See application file for complete search history.

(56) References Cited

U.S. PATENT DOCUMENTS

| | | | | |
|---|---|---|---|---|
| 8,522,487 B2 | 9/2013 | Whiting et al. | | |
| 2007/0157385 A1* | 7/2007 | Lemire | ................ | A61G 7/0524 5/618 |
| 2019/0125602 A1* | 5/2019 | Patmore | ................. | A61G 7/018 |

FOREIGN PATENT DOCUMENTS

| | | |
|---|---|---|
| CN | 210798256 U | 6/2020 |
| CN | 215516558 U | 1/2022 |

(Continued)

OTHER PUBLICATIONS

Grace Industries, Inc., “Fall Suspension Alert Systems”, retrieved from the Internet at URL: <https://www.graceindustries.com/safety-products/fall-arrest-safety/> on Oct. 23, 2024, 4 pages.

(Continued)

*Primary Examiner* — Van T Trieu

(74) *Attorney, Agent, or Firm* — Fredrikson & Byron, P.A.

(57) ABSTRACT

Embodiments of the present disclosure provide systems and methods for detecting falls using rotation-based sensing. In one embodiment, a system includes a railing configured to at least partially support a user, a sensor configured to output a rotational orientation value associated with the railing, and one or more processors in communication with the sensor. The one or more processors may be configured to receive the rotational orientation value from the sensor, determine that the rotational orientation value received from the sensor satisfies a threshold rotational orientation value, and cause a safety-based action to be performed based at least in part on determining that the rotational orientation value satisfies the threshold rotational orientation value.

17 Claims, 5 Drawing Sheets

(56) References Cited

FOREIGN PATENT DOCUMENTS

| | | | |
|---|---|---|---|
| CN | 216352724 | U | 4/2022 |
| CN | 115522725 | A | 12/2022 |
| KR | 101753240 | B1 | 7/2017 |
| KR | 101850346 | B1 | 4/2018 |
| KR | 20-0496891 | Y1 | 5/2023 |
| KR | 10-2023-0125453 | A | 8/2023 |

OTHER PUBLICATIONS

International Searching Authority, “International Search Report and Written Opinion”, From Application No. PCT/US2025/038892, mailed Nov. 21, 2025, pp. 23.

International Searching Authority, “Partial International Search and Written Opinion”, From Application No. PCT/US2025/038892, mailed Sep. 30, 2025, pp. 17.

* cited by examiner

SYSTEMS AND METHODS FOR DETECTING FALLS USING ROTATION-BASED SENSING

TECHNICAL FIELD

Embodiments of the present disclosure generally relate to the field of occupational safety, and specifically to systems and methods for detecting falls using rotation-based sensing.

BACKGROUND

Falls pose serious safety hazards across of variety of environments and activities. Whether occurring in the workplace with equipment like cherry pickers and scissor lifts, in homes with children falling from cribs, or in recreational settings where individuals may fall off of vehicles, falls can lead to severe injuries or even fatalities. In many examples, falls may occur where railings and/or physical restraints are present to prevent falls. However, despite the implementation of such fall prevent systems, falls still occur. In some examples, although safety railings may prevent a percentage of falls from occurring, medical response professionals may not arrive quickly enough to provide effective treatment for the fall victim.

BRIEF SUMMARY

In accordance with a first aspect of the disclosure, a method is provided. In some embodiments, the method is executable by one or more computing devices embodied in hardware, software, firmware, and/or any combination thereof as described herein. In some examples, the method may include receiving, by one or more processors, a rotational orientation value output by a sensor, the rotational orientation value associated with a railing configured to at least partially support a user; determining, by the one or more processors, that the rotational orientation value received from the sensor satisfies a threshold rotational orientation value; and causing, by the one or more processors, a safety-based action to be performed based at least in part on determining that the rotational orientation value satisfies the threshold rotational orientation value.

In some examples, the method may include receiving, by the one or more processors, a pressure value indicative of a stability of the user, wherein the one or more processors cause the safety-based action to be performed based at least in part on (i) the rotational orientation value satisfying the threshold rotational orientation value and (ii) the pressure value satisfying a threshold pressure value. In some examples, the rotational orientation value associated with the railing is indicative of a rotation of a removable grip-assistance component.

In some examples, the rotational orientation value associated with the railing is indicative of a rotation of the railing. In some examples, the safety-based action comprises deploying a retractable safety net. In some examples, the safety-based action comprises providing an alert tone. In some examples, the safety-based action comprises providing a message to an emergency response professional indicating that the user has fallen.

In accordance with a second aspect of the disclosure, an apparatus is provided. In one example embodiment of the apparatus, the apparatus includes one or more processors and a memory storing instructions that, when executed by the one or more processors, cause the apparatus to perform any one or more of the methods described herein. A second example apparatus includes means for performing each step of any one of the methods described herein.

In accordance with a third aspect of the disclosure, a system is provided. In one example embodiment of the system, the system includes a railing configured to at least partially support a user; a sensor configured to output a rotational orientation value associated with the railing; and one or more processors in communication with the sensor, the one or more processors configured to: receive the rotational orientation value from the sensor; determine that the rotational orientation value received from the sensor satisfies a threshold rotational orientation value; and cause a safety-based action to be performed based at least in part on determining that the rotational orientation value satisfies the threshold rotational orientation value.

In some examples, the sensor comprises a gyroscopic sensor. In some examples, the system includes a removable grip-assistance component in contact with the railing, the removable grip-assistance component comprising the sensor. In some examples, the system includes a second sensor configured to output a pressure value indicative of a stability of the user, wherein the one or more processors are configured to cause the safety-based action to be performed based at least in part on (i) the rotational orientation value satisfying the threshold rotational orientation value and (ii) the pressure value satisfying a threshold pressure value.

In some examples, the system includes a second sensor configured to output an acceleration value indicative of an acceleration of the railing, wherein the one or more processors are configured to cause the safety-based action to be performed based at least in part on (i) the rotational orientation value satisfying the threshold rotational orientation value and (ii) the acceleration value satisfying a threshold acceleration value.

In some examples, the system includes a removable mat component in contact with an elevated work surface, wherein the removable mat component comprises a second sensor configured to output a pressure value. In some examples, the rotational orientation value associated with the railing is indicative of a rotation of a removable grip-assistance component. In some examples, the rotational orientation value associated with the railing is indicative of a rotation of the railing. In some examples, the system includes a retractable safety net, wherein the safety-based action comprises deploying the retractable safety net.

In some examples, the system includes an auditory alert component, wherein the safety-based action comprises providing an alert tone via the auditory alert component. In some examples, the safety-based action comprises providing a message to an emergency response professional indicating that the user has fallen. In some examples, the railing is coupled with (i) an elevated work surface, (ii) a building, (iii) a vehicle, or (iv) a crib.

DETAILED DESCRIPTION

Figure 1:
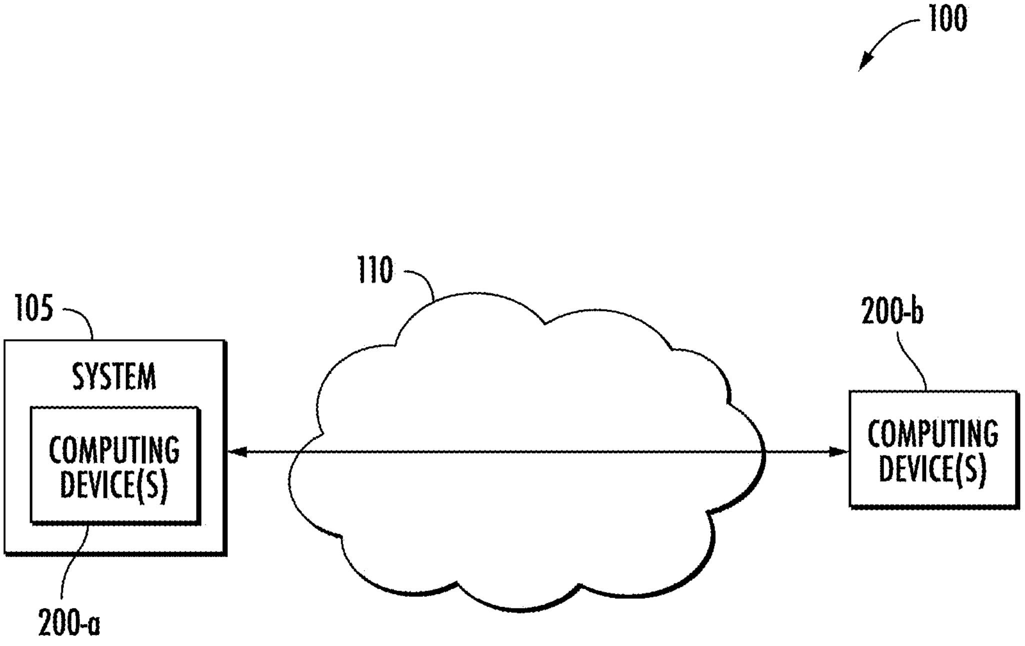
FIG. 1 illustrates a system for detecting falls using rotation-based sensing in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

Overview

Falls pose serious safety hazards across of variety of environments and activities. Whether occurring in the workplace with equipment like cherry pickers and scissor lifts, in homes with children falling from cribs, or in recreational settings where individuals may fall off of vehicles, falls can lead to severe injuries or even fatalities. In many examples, falls may occur where railings and/or physical restraints are present to prevent falls. However, despite the implementation of such fall prevent systems, falls still occur. In some examples, although safety railings may prevent a percentage of falls from occurring, medical response professionals may not arrive quickly enough to provide effective treatment for the fall victim.

In accordance with one or more examples described herein, improved systems and methods for detecting falls are provided. For example, a system of the present disclosure may include one or more rotational sensors (e.g., gyroscopic sensors), which may be utilized to detect whether a fall is about to occur. The one or more rotational sensors may be adhered to a railing, such as a railing of a scissor lift, which may enable one or more conditions indicative of a potential fall to be detected. For example, a worker who is using a scissor lift may lean onto a railing of the scissor lift, which may cause the railing to rotate (e.g., due to deflection of the railing). The one or more rotational sensors may detect the rotation of the railing and output one or more rotational orientation values to one or more processors. The one or more processors may then determine if the one or more rotational orientation values satisfy a threshold rotational orientation value. If the one or more rotational orientation values satisfy the threshold rotational orientation value, the one or more processors may cause one or more safety-based actions to be performed. For example, the one or more processors may cause a retractable safety net to be deployed, which may prevent the worker from falling to the ground.

As described herein, the one or more sensors may be attached directly to the railing. In some other examples, the one or more sensors may be embedded within or attached to a removable grip-assistance component, which may be placed on or around the railing. By placing the one or more sensors directly on the railing or in the removable grip-assistance component, the fall prevention techniques described herein may be implemented without substantial modification to existing systems. As a result, the described systems and techniques may be employed in a wider array of environments without causing individuals or organizations to incur substantial costs that would otherwise be associated with purchasing new equipment with integrated safety systems (e.g., a new scissor lift with an integrated, weight-based fall prevention system).

Additionally, the rotation-based fall-prevention techniques of the present disclosure enable potential falls to be detected in scenarios where a conventional weight-based fall prevention system may be defeated. For example, in a conventional system that only detects the weight of a user on an elevated platform, a worker may place a weight on the elevated surface to defeat the weight-based fall prevention system. In such an example, the worker may proceed to stand on a railing and cause the railing to deflect or otherwise rotate. Although such behaviors may go undetected by conventional fall prevention systems, the systems and techniques of the present disclosure provide the ability to detect such scenarios and thus provide improved fall protection. Many other advantages may be apparent to a person of ordinary skill in the art, such as improved emergency response time by way of automatic alerts and messaging, among other examples.

Definitions

In some embodiments, the term "system" refers to an arrangement or collection of one or more components (e.g., real or virtualized). The one or more components may be coupled through various means, such as one or more electronic couplings (e.g., wired and/or wireless) and/or one or more physical couplings. As described herein, one or more components that are coupled may be in communication with one another (e.g., via a wired or wireless connection). In some examples, one or more components that are coupled (e.g., physically coupled) may be in contact with one another.

A system as described herein may be an example of a life safety system or any other system configured to support, restrain, transport, or guide one or more users (e.g., one or more individuals). For example, a system may be an aerial work platform system, a scissor lift system, a cherry picker system, a window washing system, and/or the like. Such systems may include one or more elevated work surfaces (e.g., one or more platforms where a user may stand or sit), one or more railings (e.g., one or more containment devices), one or more lifting components (e.g., a motor and/or a mechanical system configured to position and/or elevate the system and/or one or more components of the system).

As described herein, a system may include any set of one or more components configured to restrain or guide one or more users such that falls are prevented (e.g., a fall prevention system). As such, a scissor lift may be an example of a system. The scissor lift may include one or more components configured to prevent users from falling off of the scissor lift. The one or more components may include one or more elevated work surfaces, one or more railings, one or more computing devices, one or more sensors, one or more removable components (e.g., a removable grip-assistance component, a removable mat component), one or more processors (e.g., which may or may not be included in the one or more computing devices), one or more retractable safety nets, one or more auditory alert components, one or more visual alert components, and/or the like.

As another example, a crib may be an example of a system. As such, a crib may include any one or more of the one or more components described herein. The one or more components may be configured to prevent users (e.g., infants) from falling out of the crib. As another example, a vehicle, such as a boat, may be an example of a system. As such, a vehicle may include any one or more of the one or more components described herein. The one or more components may be configured to prevent users from falling off of the vehicle. As another example, a building or structure may be an example of a system. Such a system may include one or more railings and/or barriers to prevent one or more users (e.g., individuals) from falling while using one or more stairwells in the building and/or from falling off of a roof of the building. As such, a building may include any one or more of the one or more components described herein. The one or more components may be configured to prevent users from falling.

As described herein, a system may include one or more sensors. In some examples, the one or more sensors may be components of one or more computing devices. However, in some other examples, the one or more sensors may not be included in one or more computing devices and may operate in a standalone capacity. The one or more sensors may include one or more rotational sensors (e.g., one or more gyroscopic sensors, one or more gyroscopes), one or more pressure sensors (e.g., one or more weight sensors), one or more accelerometers, one or more motion sensors, or any combination thereof.

In some embodiments, the term "computing device" refers to an electronic device that may be configured to perform one or more tasks. A computing device may be embodied in hardware, software, firmware, and/or a combination thereof. In some examples, a computing device may control or otherwise communicate with one or more components of a system (e.g., one or more sensors, one or more auditory alert components, one or more processors). In some examples, a computing device may include one or more components that generate one or more user interfaces capable of being rendered to one or more displays of the computing device. As described herein, a computing device may generate and/or maintain information (e.g., data) utilized to perform one or more operations. In some examples, a computing device may include one or more personal computers, one or more end-user terminals, one or more monitors, and/or one or more displays. Additionally, or alternatively, in some examples, a computing device may include one or more data repositories embodied in hardware, software, firmware, and/or any combination thereof to support functionality provided by the computing device.

In some embodiments, the term "processor" refers to a component or device (e.g., real or virtualized) that is configurable to perform one or more operations, calculations, determinations, or logical processes. In some examples, one or more processors may be subcomponents of one or more computing devices. In some other examples, however, one or more processors may be implemented as virtualized elements of a virtualized computing system. It should also be noted that the one or more processors may be configured to perform any one or more of the operations described herein.

In some embodiments, the term "railing" refers to a device or assembly configured to prevent one or more individuals (e.g., users) from falling. In some examples, a railing may enable a user to support themself while performing one or more tasks, such as walking up stairs, performing a maintenance operation (e.g., while standing on an elevated work surface), and/or the like. A railing may be a component of an elevated work surface, a crib, a vehicle, a building, and/or the like. As such, a railing may be coupled with (e.g., in contact with, secured onto) an elevated work surface, a crib, a vehicle, a building, and/or the like. In some examples, a railing may include or otherwise be coupled with one or more sensors. For example, one or more rotational sensors (e.g., gyroscopic sensors) may be imbedded within a railing or attached to an exterior surface of a railing. In some examples, one or more sensors may be attached to a railing using a removable grip-assistance component. For example, the one or more sensors may be attached directly to the removable grip-assistance component and the removable grip-assistance component may be attached directly to the railing.

In some embodiments, the term "sensor" refers to a device and/or component (e.g., of a system) that detects, measures, or otherwise responds to one or more phenomenon. In some examples, a sensor may output one or more signals and/or values indicative of one or more measurements. Some non-limiting examples of sensors include force sensors (e.g., pressure sensors, weight sensors), rotational sensors (e.g., gyroscopic sensors), accelerometers, motion sensors, optical sensors (e.g., light sensors), proximity sensors, temperature sensors, humidity sensors, sound sensors, and/or the like.

In some examples, one or more processors may receive one or more signals from one or more sensors. The one or more processors may then perform one or more calculations and/or make one or more determinations based on the one or more signals received from the one or more sensors. For example, one or more processors associated with a safety system (e.g., an elevated work surface) may receive a signal from a rotational sensor (e.g., a gyroscopic sensor). In such an example, the signal may indicate one or more rotational orientation values that represent or otherwise indicate a rotation of one or more components of the safety system. For example, the rotational sensor may be coupled with a railing of the elevated work surface and output one or more rotational orientation values representative of an orientation (e.g., an angle) of the railing. The one or more processors may receive the one or more rotational orientation values and determine whether the one or more rotational orientation values satisfy a threshold rotational orientation value (e.g., if the rotation of the railing is greater than or equal to a maximum allowable rotation). If the threshold rotational orientation value is satisfied, the one or more processors may initiate or otherwise cause one or more safety-based actions to be performed.

In some embodiments, the term "user" refers to a person or individual who uses or interacts with a system. For example, a user may be a worker that utilizes an elevated work surface to perform one or more tasks. Additionally, or alternatively, a user may be an individual who receives a notification, a message, and/or an alert generated or otherwise initiated by one or more processors (e.g., one or more processors of or associated with the elevated work surface).

In some embodiments, the term "rotational orientation value" refers to a value, such an integer or decimal value that represents an orientation of a system and/or a component of a system (e.g., a railing). In some examples, a rotational orientation value may be an angle or a percentage. For example, a rotational orientation value may be an angle that represents a rotation of a system and/or a component of a system with respect to a horizontal axis. In some examples, the rotational orientation value may increase or decrease in response to user input. For example, a user that leans on a railing of a cherry picker or industrial lift device may cause the rotational orientation value for the railing to change (e.g., to increase).

In some examples, the rotational orientation value for the railing may be zero in an undisturbed or normal configuration (e.g., when a user is not leaning on or touching the railing). In some examples, a rotational orientation value greater than or equal to a threshold rotational orientation value (e.g., greater than zero, greater than a preconfigured angle) may indicate or otherwise correspond to an unsafe configuration and/or an impending fall by the user. For example, a user may lean on the railing and cause the orientation of the railing (and/or a removable grip-assistance component that houses the sensor) to rotate to a rotational orientation value of five degrees. Such a rotational orientation value may exceed a threshold rotational orientation value of two degrees. Accordingly, the rotational orientational value may indicate that an unsafe working condition exists. Accordingly, one or more processors may determine that the threshold rotational orientation value has been exceeded and determine to initiate or otherwise cause one or more safety-based actions.

In some embodiments, the term "safety-based action" refers to an action that is performed to improve user safety. For example, a device (e.g., a net deployment device) may deploy a safety net that breaks or ends a user's fall. The device may deploy the safety net in response to receiving a signal from one or more processors. Accordingly, the one or more processors may cause the safety net to be deployed. In some examples, a safety-based action may include sounding an auditory and/or visual alert. For example, an auditory and/or visual alert component (e.g., that is attached to an elevated work surface) may receive a signal from one or more processors that causes the auditory and/or visual alert component to provide an auditory and/or visual alert. The alert may enable one or more bystanders to take one or more corrective actions that prevent a user from falling. Additionally, or alternatively, the alert may enable one or more bystanders to avoid being injured by a falling user and/or equipment.

In some examples, a safety-based action may include sending one or more messages to one or more individuals. For example, one or more processors may cause one or more communication components to send an alert message to one or more emergency response professionals who may take one or more actions to prevent a fall from occurring. In some examples, the one or more emergency response professionals may not be able to prevent a fall from occurring, however, the message may enable the one or more emergency response professionals to more efficiently (e.g., more quickly) provide treatment to a user when compared to a scenario in which a message was not delivered or was delivered by word-of-mouth.

In some embodiments, the term "pressure value" refers to a value that is output by a force sensor. A pressure value may be indicative of a weight of a user, a weight distribution of a user, and/or a force exerted by a user (e.g., a force exerted on a force sensor, which may be coupled with a railing, an elevated work surface, a removable grip-assistance component, a removable mat component, and/or the like). In some examples, a pressure value may indicate a balance and/or stability of a user on a surface, such as an elevated work surface. For example, a pressure value may decrease or go to zero, which may indicate that a user has lifted one or more feet off of a work surface (e.g., to balance on a single foot). Additionally, or alternatively, a pressure value and/or signal representative of the pressure value may fluctuate in magnitude (e.g., beyond a threshold fluctuation magnitude), which may indicate that a user is unsteady or otherwise making dangerous movements.

In some examples, a pressure value may indicate whether a user has exerted a force on a railing, a removable grip-assistance component, and/or the like. For example, a user may lean onto or place a hand on a removable grip-assistance component, which may cause a pressure sensor embedded in the removable grip-assistance component to output one or more values indicative of a quantity of force applied to the removable grip-assistance component by the user. As described herein, one or more pressure values may be communicated to one or more processors. The one or more processors may then determine whether the one or more pressure values have satisfied (e.g., exceeded) one or more pressure value thresholds. If the one or more pressure values have satisfied the one or more pressure value thresholds, the one or more processors may cause one or more safety-based actions to be performed.

In some embodiments, the term "removable grip-assistance component" refers to a component or device that may be coupled with a railing. For example, a removable grip-assistance component may be placed onto and at least partially surround a railing. In some examples, a removable grip-assistance component may be rigidly adhered to a railing. In some other examples, a removable grip-assistance component may be placed onto a railing in such a way that the removable grip-assistance component may at least partially rotate about the railing (e.g., if a force exerted on the removable grip-assistance component exceeds a threshold force). In such examples, allowing the removable grip-assistance component to at least partially rotate about the railing may enable excessive forces applied to the railing by a user to be tracked or otherwise indicated via rotational orientation values output via one or more sensors embedded in the removable grip-assistance component. For example, if a user grips a railing and applies a force to the railing (e.g., by leaning over the railing in an unsafe manner), the removable grip-assistance component may rotate about the railing. A rotational sensor in the removable grip-assistance component may then communicate a rotational orientation value to one or more processors, which may indicate the rotation of the removable grip-assistance component and/or that the user is interfacing with the railing in an unsafe manner that may lead to a fall.

Although some examples described herein refer to a removable grip-assistance component that is configured to at least partially rotate about a railing, it should be noted that other configurations may also be utilized, such as a configuration in which the removable grip-assistance component is rigidly attached to a railing. In such a configuration where the removable grip-assistance component is rigidly attached to a railing, a rotational sensor embedded in the removable grip-assistance component may output one or more rotational orientation values indicative of an extent to which the railing has rotated in response to deflection of the railing, the railing assembly, and/or any other object or system to which the railing is attached (e.g., an elevated work surface, a vehicle, a structural component of a building, a crib, and/or the like).

In some embodiments, the term "removable mat component" refers to a component or device that may be coupled with a surface, such as an elevated work surface. In some examples, a removable mat component may be placed onto a horizontal surface where a user may stand, sit, or lie. In some examples, the removable mat component may be rigidly attached to the surface. In some examples, the removable mat component may include one or more sensors. The one or more sensors (e.g., force sensors, pressure sensors, weight sensors) may be embedded in the removable mat component and/or attached to an underside of the removable mat component. In either configuration, the one or more sensors may detect one or more forces exerted on the removable mat component, which may be indicative of a location of a user, a balance of a user, a stance of a user (e.g., whether the user is standing on one or two legs), and/or the like.

In some embodiments, the term "elevated work surface" refers to a surface that physically supports one or more users. For example, a cherry picker and/or industrial scissor lift may include an elevated work surface, which one or more users may stand on while completing one or more tasks in a position that is above a ground level. In some examples, a removable mat component may be placed onto or otherwise rigidly coupled with an elevated work surface. In some examples, an elevated work surface may be horizontal. However, in some examples, an elevated work surface may be configured to tilt or otherwise change its orientation in response to user control inputs. Although some examples described herein refer to removable mat components being placed on elevated work surfaces, removable mat components may be deployed in any other context without loss of meaning. For example, a removable mat component may be placed on platform within a crib, on a floor that is near or otherwise adjacent to a railing, on a surface of a vehicle (e.g., on the deck of a boat near a railing), and/or the like.

In some embodiments, the term "retractable safety net" refers to a net or fall prevention device that is configured to prevent a user from falling or otherwise reduce harm to a user associated with a fall. A retractable safety net may be configured to extend or to otherwise be deployed in response to one or more criteria being satisfied. For example, a retractable safety net may be deployed if one or more sensors output one or more values that satisfy a threshold value. In some examples, a retractable safety net may be mounted a device, such as an elevated work surface, a crib, a vehicle, a building, and/or the like. In one example, a retractable safety net may be mounted to an edge of an elevated work surface.

In some examples, a retractable safety net may be deployed via a safety net deployment system. The safety net deployment system may include one or more telescoping frame components that extend, spread, or otherwise deploy the retractable safety net. In some examples, the safety net deployment system may include one or more mounting devices for attaching the retractable safety net to a device or component of a system (e.g., an edge of an elevated work surface).

In some embodiments, the term "auditory alert component" refers to a device or component that is configured to output one or more auditory alerts. In some examples, an auditory alert component may be in communication with one or more processors. In such examples, the one or more processors may communicate one or more signals to the auditory alert component, which may cause the auditory alert component to emit one or more auditory alerts. An auditory alert may serve to notify one or more users and/or one or more bystanders that a fall or accident is impending. In some examples, an auditory alert may serve to notify one or more users and/or one or more bystanders that a fall has occurred. Although some examples described herein refer to an auditory alert component outputting one or more auditory alerts, it should be understood that a visual alert component may additionally, or alternatively be utilized to output one or more visual alerts (e.g., one or more flashing lights may indicate that a fall is about to occur).

In some embodiments, the term "message" refers to a text and/or audio communication which may be transmitted to one or more individuals. In some examples, a communication component may be utilized to transmit a message. For example, one or more processors may transmit a signal to a communication component. The communication component may then transmit a message to one or more individuals (e.g., via one or more computing devices, via one or more external computing devices) in response to receiving the signal from the one or more processors. In some examples, a message may include an indication that a fall has occurred or an indication that a fall is imminent.

Example Systems and Processes of the Disclosure

FIG. 1 illustrates a system for detecting falls using rotation-based sensing in accordance with one or more embodiments of the present disclosure. Specifically, FIG. 1 depicts an example system 100 within which embodiments of the present disclosure may operate to perform the techniques described herein. For example, any one or more of the devices and/or systems described with reference to FIG. 1 may perform any one or more of the techniques described herein. As depicted, the system 100 includes one or more computing devices 200-*a*, which may be computing devices 200 of a system 105 (e.g., a fall prevention system, a life safety system, a cherry picker, a scissor lift, a crib, a railing system, a vehicle, a building, and/or the like. The system 100 may also include one or more computing devices 200-*b* (e.g., one or more external computing devices), which may be in communication with the one or more computing devices 200-*a*. In some examples, the one or more computing devices 200-*a* may communicate with the one or more computing devices 200-*b* over one or more communication networks, such as the communication network 110.

In some embodiments, the one or more computing devices 200-*a* may include any number of computing devices 200, entities, and/or systems embodied in hardware, software, firmware, and/or a combination thereof that control, operate, and/or are onboard or physically coupled with a system 105 (e.g., a computing device 200-*a* that is on a cherry picker). In some examples, the one or more computing devices 200-*a* may control or otherwise communicate with one or more physical components of the system 105, including and without limitation one or more displays, one or more drive systems, one or more motors, one or more antennas, one or more sensors, and/or the like. In some embodiments, the system 105 may include one or more sensors that gather, collect, and/or otherwise aggregate sensor data associated with the system 105 and/or an environment associated therewith.

Additionally, or alternatively, in some embodiments, the one or more computing devices 200-*a* may include one or more computing devices and/or systems that generate one or more user interfaces capable of being rendered to one or more displays of the one or more computing devices 200-*a*. Additionally, or alternatively, in some embodiments, the one or more computing devices 200-*a* include one or more computing devices and/or systems that generate and/or maintain data embodying and/or utilized to recreate a virtual environment including virtual aspects corresponding to and/or associated with a real-world environment. It will be appreciated that the system 105 may include any number of physical components that enable the system 105 to operate in a particular manner.

In some embodiments, the one or more computing devices 200-*a* include one or more personal computers, one or more end-user terminals, one or more monitors, and/or one or more displays. Additionally, or alternatively, in some embodiments, the one or more computing devices 200-*a* include one or more data repositories embodied in hardware, software, firmware, and/or any combination thereof to support functionality provided by the one or more computing devices 200-*a*. In some embodiments, the one or more computing devices 200-*a* may include one or more specially configured integrated systems that process data received by and/or controlled by one or more computing devices 200-*b*.

In some examples, the one or more computing devices 200-*a* may receive data from the one or more computing devices 200-*b* that provides additional context with respect to the environment in which the system 105 is operating. For example, in some embodiments, the one or more computing devices 200-*a* may communicate with the one or more computing devices 200-*b* to receive sensor data of a particular data type that is not capturable directly by the one or more computing devices 200-*a*. For example, in some embodiments, the system 105 may not include a particular sensor for capturing a particular type of data, and instead may receive such data of the particular data type from the one or more computing devices 200-*b*.

In some embodiments, the one or more computing devices 200-*b* may be examples of systems and/or devices capable of communicating or otherwise sharing data with the system 105. In some examples, the one or more computing devices 200-*b* may generate data. That is, data may originate from the one or more computing devices 200-*b*. Additionally, or alternatively, the one or more computing devices 200-*b* may receive data that originates from one or more other sources and communicate or otherwise relay the data to one or more devices. The one or more computing devices 200-*b* may include one or more data storage systems, such as volatile or non-volatile memory devices.

The one or more computing devices 200-*b* may include one or more computing devices and/or systems that store and/or generate data. In some examples, the computing device 200-*b* may be an example of a computing device operated by an emergency response professional. In some embodiments, the one or more computing devices 200-*b* include one or more application servers, one or more end user terminals, one or more personal computers, one or more mobile devices, one or more user devices, and/or the like. Additionally, or alternatively, in some embodiments, the one or more computing devices 200-*b* include one or more database server specially configured to store data pushed from one or more other computing devices and/or systems (e.g., the one or more computing devices 200-*a*) and/or retrieve data in response to one or more queries from one or more other computing devices and/or systems. In some embodiments, the one or more computing devices 200-*b* include one or more remote and/or cloud computing devices accessible to the system 105 over a communications network, such as the communications network 110.

In some embodiments the communications network 110 enables communication between the various computing devices and/or systems utilizing one or more combinations of wireless and/or wired data transmissions and protocols. In this regard, the communications network 110 may embody any of a myriad of network configurations. In some embodiments, the communications network 110 embodies a public network (e.g., the internet) in whole or in part. In some embodiments, the communications network 110 embodies a private network (e.g., an internal network between particular computing devices) in whole or in part. Additionally, or alternatively, in some embodiments the communications network 110 embodies a direct or private connection facilitated over satellite and/or radio systems. In some other embodiments, the communications network 110 embodies a hybrid network (e.g., a network enabling internal communications between connected computing devices and external communications with other computing devices).

The communications network 110 may include one or more base stations, one or more relays, one or more routers, one or more switches, one or more cell towers, one or more communications cables, one or more satellites, one or more radio antennas, and/or one or more related control systems and/or associated routing stations. In some embodiments, the communications network 110 includes one or more user entity-controlled computing devices and/or other enterprise devices (e.g., an end-user or enterprise router, modem, switch, and/or other network access point) and/or one or more external utility devices (e.g., one or more internet service provider communication towers, one or more cell towers, and/or one or more other devices).

Figure 2:
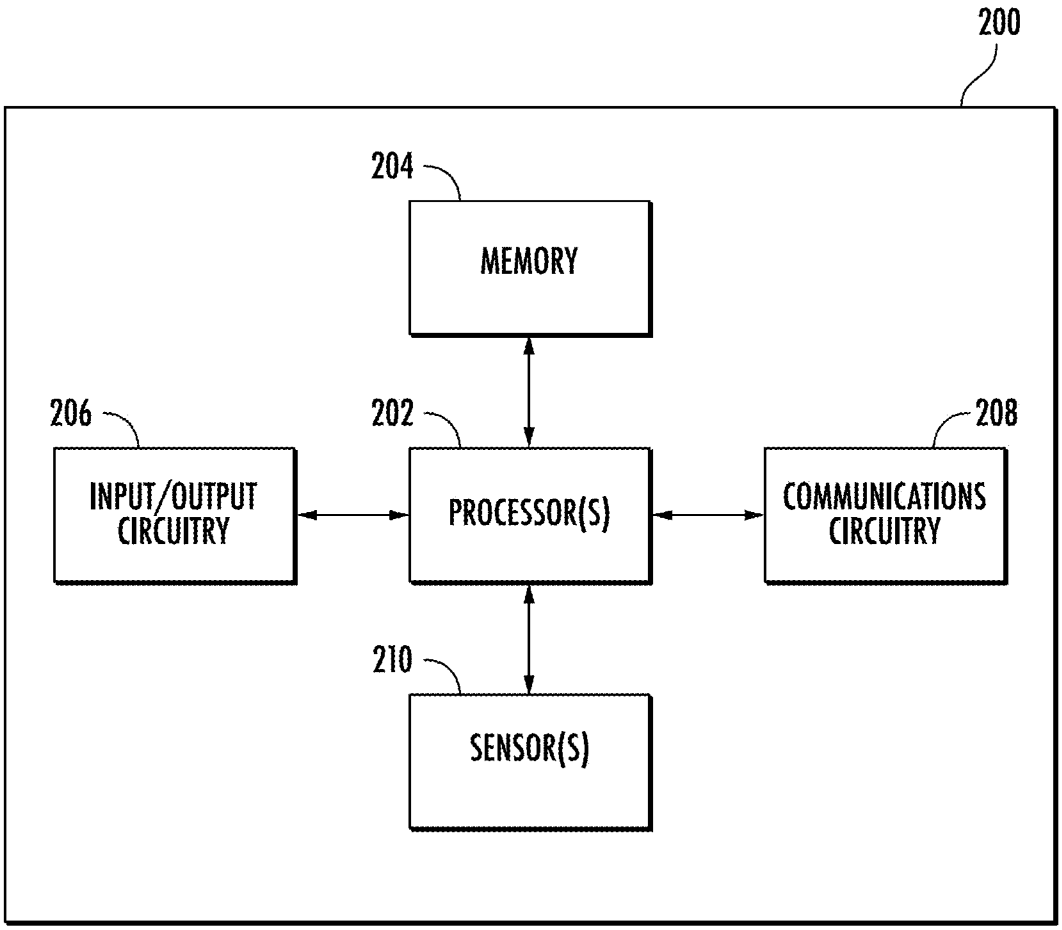
FIG. 2 illustrates a block diagram of a computing device for detecting falls using rotation-based sensing in accordance with one or more embodiments of the present disclosure.

FIG. 2 illustrates a block diagram of a computing device for detecting falls using rotation-based sensing in accordance with one or more embodiments of the present disclosure. Specifically, FIG. 2 depicts a computing device 200. As depicted, the computing device 200 includes one or more processors 202, one or more memories 204, input/output circuitry 206, communications circuitry 208, and/or one or more sensors 210, any of which may perform any one or more operations as described herein.

In some embodiments, the computing device 200 is configured, using one or more of the sets of circuitry embodying the processor 202, the memory 204, the input/output circuitry 206, the communications circuitry 208, and/or the one or more sensors 210 to execute any one or more of the operations described herein. Although components are described with respect to functional limitations, the particular implementations may include the user of the particular computing hardware, who may provide inputs to and/or receive outputs from the computing device 200 via the input/output circuitry 206. It should also be understood that in some embodiments certain components described herein include similar or common hardware. For example, two sets of circuitry may both leverage use of the same processor 202, network interface, storage medium, and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Additionally, or alternatively, in some embodiments, other elements of the computing device 200 may provide or supplement the functionality of another particular set of circuitry. For example, the processor 202 in some embodiments provides processing functionality to any of the other sets of circuitry, the memory 204 provides storage functionality to any of other the sets of circuitry, the communications circuitry 208 provides network interface functionality to any of the other sets of circuitry, and/or the like.

In some embodiments, the processor 202 (and/or co-processor or any other processing circuitry assisting or otherwise associated with the processor) is/are in communication with the memory 204 via a bus for passing information among components of the computing device 200. In some embodiments, for example, the memory 204 is non-transitory and includes, for example, one or more volatile and/or non-volatile memories. In other words, for example, the memory 204 may include or embody an electronic storage device (e.g., a computer readable storage medium). In some embodiments, the memory 204 is configured to store information, data, content, applications, instructions, or the like, for enabling the computing device 200 to carry out various functions in accordance with example embodiments of the present disclosure.

In various embodiments, the processor 202 is embodied in a number of different ways. For example, in some example embodiments, the processor 202 includes one or more processing devices configured to operate independently. Additionally, or alternatively, in some embodiments, the processor 202 includes a processor configured in tandem via a bus to enable independent execution of instructions, pipelining, and/or multithreading. The use of the terms "processor" and "processing circuitry" should be understood to include a single core processor, a multi-core processor, multiple processors internal to the computing device 200, and/or one or more remote or cloud-based processors external to the computing device 200.

In an example embodiment, the processor 202 is configured to execute instructions stored in the memory 204 or otherwise accessible to the processor 202. Additionally, or alternatively, the processor 202 may be configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Additionally, or alternatively, as another example, when the processor 202 is embodied as an executor of software instructions, the instructions specifically configure the processor 202 to perform the algorithms embodied in the specific operations described herein when such instructions are executed.

In some embodiments, computing device 200 includes input/output circuitry 206 and/or communications circuitry 208 that provides output to a user and/or receives input from a user. In some embodiments, the input/output circuitry 206 and/or the communications circuitry 208 is/are in communication with the processor 202 to provide such functionality. The input/output circuitry 206 may comprise one or more user interfaces and in some embodiments includes one or more displays that comprise the one or more interfaces rendered as a web user interface, an application user interface, a user device, a backend system, or the like. In some embodiments, the input/output circuitry 206 also includes a keyboard, a mouse, a joystick, a touch screen, touch areas, soft keys, a microphone, a speaker, or other input/output mechanisms. The processor 202, and/or input/output circuitry 206 comprising a processor, in some embodiments is configured to control one or more functions of one or more user interface elements through computer program instructions (e.g., software and/or firmware) stored on a memory accessible to the processor 202 (e.g., memory 204, and/or the like). In some embodiments, the input/output circuitry 206 includes or utilizes a user-facing application to provide input/output functionality to a service maintainer device and/or other display associated with a user.

The communications circuitry 208 includes any means such as a device or circuitry embodied in either hardware or a combination of hardware and software that is configured to receive and/or transmit data from/to a communications network and/or any other computing device, circuitry, or module in communication with the computing device 200. In this regard, the communications circuitry 208 includes, for example in some embodiments, a network interface for enabling communications with a wired or wireless communications network. Additionally, or alternatively in some embodiments, the communications circuitry 208 includes one or more network interface cards, one or more antennas, one or more busses, one or more switches, one or more routers, one or more modems, and supporting hardware, firmware, and/or software, or any other device suitable for enabling communications via one or more communication networks. Additionally, or alternatively, the communications circuitry 208 includes circuitry for interacting with the one or more antennas and/or other hardware or software to cause transmission of signals via the one or more antennas or to handle receipt of signals received via the one or more antennas. In some embodiments, the communications circuitry 208 enables transmission to and/or receipt of data from one or more computing devices 200 and/or systems of one or more computing devices 200.

The one or more sensors 210 include hardware, software, firmware, and/or a combination thereof, that supports generation, capturing, aggregating, retrieval, and/or receiving of one or more portions of data, such as sensor data and/or image data. The one or more sensors 210 in some embodiments are affixed to, within, and/or otherwise a part of a system including or otherwise associated with the computing device 200. Non-limiting examples of sensors 210 include position sensors, pressure sensors (e.g., weight sensors), gyroscopic sensors, speed sensors, accelerometers, image cameras, video cameras, infrared sensors, and/or the like.

In some embodiments, the one or more sensors 210 include hardware, software, firmware, and/or a combination thereof, embodying one or more navigation or positional sensors. In some embodiments, the one or more navigation or positional sensors include a global positioning satellite (GPS) tracking chip and/or the like enabling location services to be requested and/or determined. Additionally, or alternatively, in some embodiments, the one or more sensors 210 include hardware, software, firmware, and/or any combination thereof, embodying one or more inertial navigation sensors that measure speed, acceleration, orientation, and/or position-related data in a 3D environment. Additionally, or alternatively, in some embodiments, the one or more sensors 210 include one or more cameras associated with a synthetic vision system (SVS). In some such embodiments, such an SVS camera captures image data representations of a real-world environment for use in generating one or more corresponding user interface depicting the captured image data, augmenting such image data, and/or otherwise providing data to enable an operator to acquire situational awareness based at least in part on the captured image data. It will be appreciated that, in some embodiments, the one or more sensors 210 include a separate processor, specially configured field programmable gate array (FPGA), or a specially programmed application specific integrated circuit (ASIC).

It will be appreciated that, in some embodiments, two or more of the sets of circuitries 202-210 are combinable. Additionally, or alternatively, in some embodiments, one or more of the sets of circuitry 202-216 perform some or all of the functionality described associated with another component. For example, in some embodiments, one or more of the sets of circuitry 202-210 are combined into a single component embodied in hardware, software, firmware, and/or a combination thereof. Similarly, in some embodiments, one or more of the sets of circuitry is/are combined with the processor 202, such that the processor 202 performs one or more of the operations described above with respect to each of these other sets of circuitry.

Figure 3:
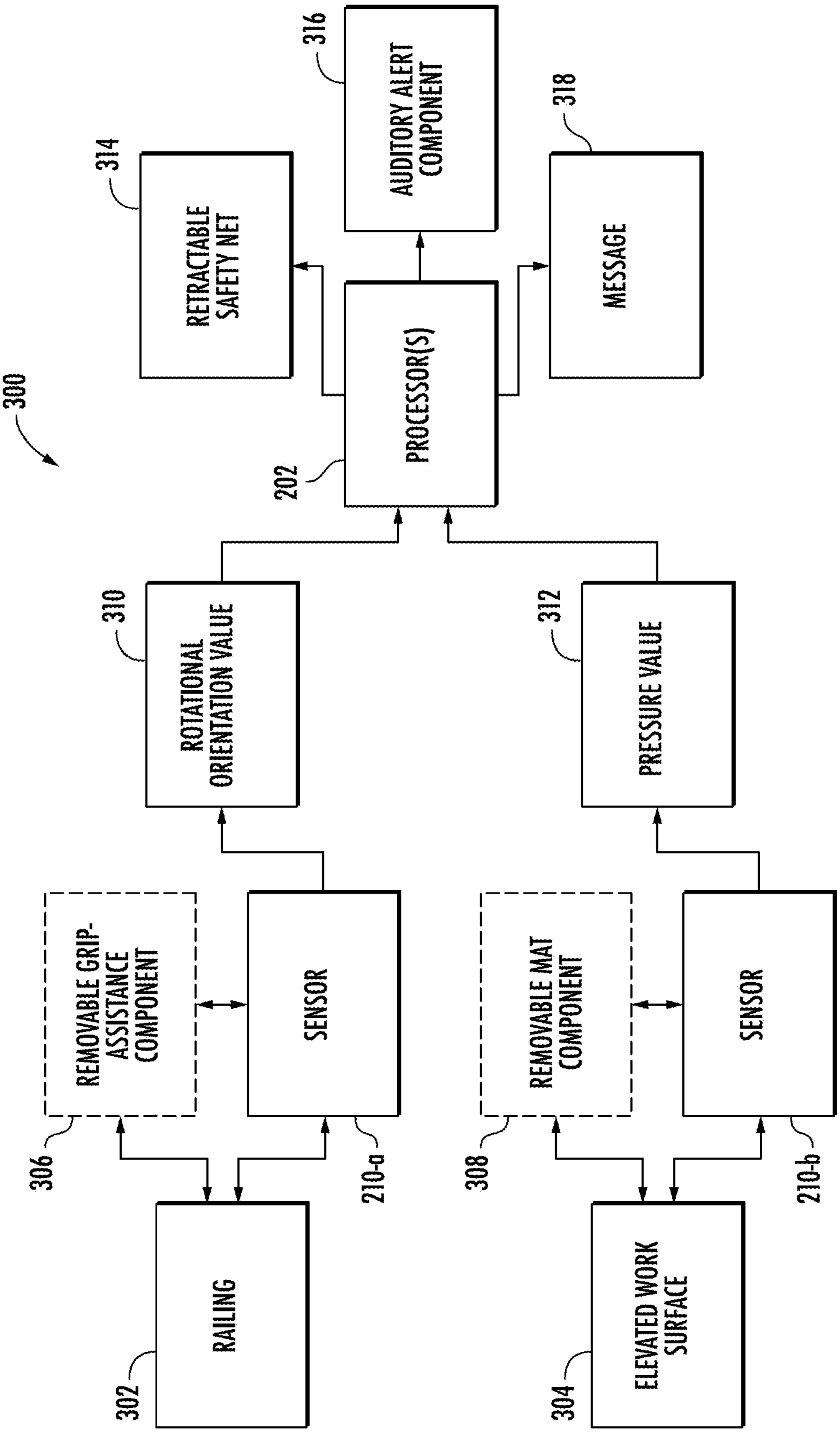
FIG. 3 is a system diagram showing example system components and data structures for detecting falls using rotation-based sensing in accordance with one or more embodiments of the present disclosure.

FIG. 3 is a system diagram 300 showing example system components and data structures of a system for detecting falls using rotation-based sensing in accordance with one or more embodiments of the present disclosure. In some examples, a system is an arrangement or collection of one or more components (e.g., real or virtualized). The one or more components may be coupled through various means, such as one or more electronic couplings (e.g., wired and/or wireless) and/or one or more physical couplings. As described herein, one or more components that are coupled may be in communication with one another (e.g., via a wired or wireless connection). In some examples, one or more components that are coupled (e.g., physically coupled) may be in contact with one another.

A system as described herein may be an example of a life safety system or any other system configured to support, restrain, transport, or guide one or more users (e.g., one or more individuals). For example, a system may be an aerial work platform system, a scissor lift system, a cherry picker system, a window washing system, and/or the like. Such systems may include one or more elevated work surfaces (e.g., one or more platforms where a user may stand or sit), one or more railings 302 (e.g., one or more containment devices), one or more lifting components (e.g., a motor and/or a mechanical system configured to position and/or elevate the system and/or one or more components of the system).

As described herein, a system may include any set of one or more components configured to restrain or guide one or more users such that falls are prevented (e.g., a fall prevention system). As such, a scissor lift may be an example of a system. The scissor lift may include one or more components configured to prevent users from falling off of the scissor lift. The one or more components may include one or more elevated work surfaces, one or more railings 302, one or more computing devices, one or more sensors 210, one or more removable components (e.g., a removable grip-assistance component 306, a removable mat component 308), one or more processors 202 (e.g., which may or may not be included in the one or more computing devices), one or more retractable safety nets 314, one or more auditory alert components 316, one or more visual alert components, and/or the like.

As another example, a crib may be an example of a system. As such, a crib may include any one or more of the one or more components described herein. The one or more components may be configured to prevent users (e.g., infants) from falling out of the crib. As another example, a vehicle, such as a boat, may be an example of a system. As such, a vehicle may include any one or more of the one or more components described herein. The one or more components may be configured to prevent users from falling off of the vehicle. As another example, a building or structure may be an example of a system. Such a system may include one or more railings 302 and/or barriers to prevent one or more users (e.g., individuals) from falling while using one or more stairwells in the building and/or from falling off of a roof of the building. As such, a building may include any one or more of the one or more components described herein. The one or more components may be configured to prevent users from falling.

As described herein, a system may include one or more sensors 210. In some examples, the one or more sensors 210 may be components of one or more computing devices. However, in some other examples, the one or more sensors 210 may not be included in one or more computing devices and may operate in a standalone capacity. The one or more sensors 210 may include one or more rotational sensors (e.g., one or more sensors 210-*a*), one or more pressure sensors (e.g., one or more sensors 210-*b*), one or more accelerometers, one or more motion sensors, or any combination thereof.

In some examples, the system may include a railing 302. The railing 302 may be configured to at least partially support a user. In some examples, a railing 302 is a device or assembly configured to prevent one or more individuals (e.g., users) from falling. In some examples, a railing 302 may enable a user to support themself while performing one or more tasks, such as walking up stairs, performing a maintenance operation (e.g., while standing on an elevated work surface 304), and/or the like. A railing 302 may be a component of an elevated work surface 304, a crib, a vehicle, a building, and/or the like. As such, a railing 302 may be coupled with (e.g., in contact with, secured onto) an elevated work surface 304, a crib, a vehicle, a building, and/or the like. In some examples, a railing 302 may include or otherwise be coupled with one or more sensors 210-*a*. For example, one or more rotational sensors (e.g., sensors 210-*a*) may be imbedded within a railing 302 or attached to an exterior surface of a railing 302. In some examples, one or more sensors 210-*a* may be attached to a railing 302 using a removable grip-assistance component 306. For example, the one or more sensors 210-*a* may be attached directly to the removable grip-assistance component 306 and the removable grip-assistance component 306 may be attached directly to the railing 302.

In some examples, a user is a person or individual who uses or interacts with a system. For example, a user may be a worker that utilizes an elevated work surface 304 to perform one or more tasks. Additionally, or alternatively, a user may be an individual who receives a notification, a message 318, and/or an alert generated or otherwise initiated by one or more processors 202 (e.g., one or more processors 202 of or associated with the elevated work surface 304).

In some examples, the system may include a sensor 210-*a* configured to output a rotational orientation value 310 associated with the railing 302. In some examples, a sensor 210 is a device and/or component (e.g., of a system) that detects, measures, or otherwise responds to one or more phenomenon. In some examples, a sensor 210 may output one or more signals and/or values indicative of one or more measurements. Some non-limiting examples of sensors 210 include force sensors (e.g., pressure sensors, weight sensors), rotational sensors (e.g., gyroscopic sensors), accelerometers, motion sensors, optical sensors (e.g., light sensors), proximity sensors, temperature sensors, humidity sensors, sound sensors, and/or the like.

In some examples, one or more processors 202 may receive one or more signals from one or more sensors 210. The one or more processors 202 may then perform one or more calculations and/or make one or more determinations based on the one or more signals received from the one or more sensors 210. For example, one or more processors 202 associated with a safety system (e.g., an elevated work surface 304) may receive a signal from a rotational sensor (e.g., a gyroscopic sensor). In such an example, the signal may indicate one or more rotational orientation values 310 that represent or otherwise indicate a rotation of one or more components of the safety system. For example, the rotational sensor may be coupled with a railing 302 of the elevated work surface 304 and output one or more rotational orientation values 310 representative of an orientation (e.g., an angle) of the railing 302. The one or more processors 202 may receive the one or more rotational orientation values 310 and determine whether the one or more rotational orientation values 310 satisfy a threshold rotational orientation value (e.g., if the rotation of the railing 302 is greater than or equal to a maximum allowable rotation). If the threshold rotational orientation value is satisfied, the one or more processors 202 may initiate or otherwise cause one or more safety-based actions to be performed.

In some examples, a rotational orientation value 310 is a value, such an integer or decimal value that represents an orientation of a system and/or a component of a system (e.g., a railing 302). In some examples, a rotational orientation value 310 may be an angle or a percentage. For example, a rotational orientation value 310 may be an angle that represents a rotation of a system and/or a component of a system with respect to a horizontal axis. In some examples, the rotational orientation value 310 may increase or decrease in response to user input. For example, a user that leans on a railing 302 of a cherry picker or industrial lift device may cause the rotational orientation value 310 for the railing 302 to change (e.g., to increase).

In some examples, the rotational orientation value 310 for the railing 302 may be zero in an undisturbed or normal configuration (e.g., when a user is not leaning on or touching the railing 302). In some examples, a rotational orientation value 310 greater than or equal to a threshold rotational orientation value (e.g., greater than zero, greater than a preconfigured angle) may indicate or otherwise correspond to an unsafe configuration and/or an impending fall by the user. For example, a user may lean on the railing 302 and cause the orientation of the railing 302 (and/or a removable grip-assistance component 306 that houses the sensor) to rotate to a rotational orientation value 310 of five degrees. Such a rotational orientation value 310 may exceed a threshold rotational orientation value of two degrees. Accordingly, the rotational orientational value may indicate that an unsafe working condition exists. Accordingly, one or more processors 202 may determine that the threshold rotational orientation value has been exceeded and determine to initiate or otherwise cause one or more safety-based actions.

In some examples, the system may include one or more processors 202 in communication with the sensor 210-*a*. In some examples, a processor 202 is a component or device (e.g., real or virtualized) that is configurable to perform one or more operations, calculations, determinations, or logical processes. In some examples, one or more processors 202 may be subcomponents of one or more computing devices. In some other examples, however, one or more processors 202 may be implemented as virtualized elements of a virtualized computing system. It should also be noted that the one or more processors 202 may be configured to perform any one or more of the operations described herein.

In some examples, a computing device is an electronic device that may be configured to perform one or more tasks. A computing device may be embodied in hardware, software, firmware, and/or a combination thereof. In some examples, a computing device may control or otherwise communicate with one or more components of a system (e.g., one or more sensors 210, one or more auditory alert components, one or more processors 202). In some examples, a computing device may include one or more components that generate one or more user interfaces capable of being rendered to one or more displays of the computing device. As described herein, a computing device may generate and/or maintain information (e.g., data) utilized to perform one or more operations. In some examples, a computing device may include one or more personal computers, one or more end-user terminals, one or more monitors, and/or one or more displays. Additionally, or alternatively, in some examples, a computing device may include one or more data repositories embodied in hardware, software, firmware, and/or any combination thereof to support functionality provided by the computing device.

In some examples, the one or more processors 202 may be configured to receive the rotational orientation value 310 from the sensor 210-*a*. In some examples, the one or more processors 202 may be configured to determine that the rotational orientation value 310 received from the sensor 210-*a* satisfies a threshold rotational orientation value. In some examples, the one or more processors 202 may be configured to cause a safety-based action to be performed based at least in part on determining that the rotational orientation value 310 satisfies the threshold rotational orientation value.

In some examples, a safety-based action is an action that is performed to improve user safety. For example, a device (e.g., a net deployment device) may deploy a safety net that breaks or ends a user's fall. The device may deploy the safety net in response to receiving a signal from one or more processors 202. Accordingly, the one or more processors 202 may cause the safety net to be deployed. In some examples, a safety-based action may include sounding an auditory and/or visual alert. For example, an auditory and/or visual alert component (e.g., that is attached to an elevated work surface 304) may receive a signal from one or more processors 202 that causes the auditory and/or visual alert component to provide an auditory and/or visual alert. The alert may enable one or more bystanders to take one or more corrective actions that prevent a user from falling. Additionally, or alternatively, the alert may enable one or more bystanders to avoid being injured by a falling user and/or equipment.

In some examples, a safety-based action may include sending one or more messages 318 to one or more individuals. For example, one or more processors 202 may cause one or more communication components to send an alert message 318 to one or more emergency response professionals who may take one or more actions to prevent a fall from occurring. In some examples, the one or more emergency response professionals may not be able to prevent a fall from occurring, however, the message 318 may enable the one or more emergency response professionals to more efficiently (e.g., more quickly) provide treatment to a user when compared to a scenario in which a message 318 was not delivered or was delivered by word-of-mouth.

In some examples, the sensor 210-*a* may be a gyroscopic sensor. In some examples, the system includes a removable grip-assistance component 306 in contact with the railing 302, the removable grip-assistance component 306 comprising the sensor 210-*a*. In some examples, a removable grip-assistance component 306 is a component or device that may be coupled with a railing 302. For example, a removable grip-assistance component 306 may be placed onto and at least partially surround a railing 302. In some examples, a removable grip-assistance component 306 may be rigidly adhered to a railing 302. In some other examples, a removable grip-assistance component 306 may be placed onto a railing 302 in such a way that the removable grip-assistance component 306 may at least partially rotate about the railing 302 (e.g., if a force exerted on the removable grip-assistance component 306 exceeds a threshold force). In such examples, allowing the removable grip-assistance component 306 to at least partially rotate about the railing 302 may enable excessive forces applied to the railing 302 by a user to be tracked or otherwise indicated via rotational orientation values 310 output via one or more sensors 210-*a* embedded in the removable grip-assistance component 306. For example, if a user grips a railing 302 and applies a force to the railing 302 (e.g., by leaning over the railing 302 in an unsafe manner), the removable grip-assistance component 306 may rotate about the railing 302. A rotational sensor in the removable grip-assistance component 306 may then communicate a rotational orientation value 310 to one or more processors 202, which may indicate the rotation of the removable grip-assistance component 306 and/or that the user is interfacing with the railing 302 in an unsafe manner that may lead to a fall.

Although some examples described herein refer to a removable grip-assistance component 306 that is configured to at least partially rotate about a railing 302, it should be noted that other configurations may also be utilized, such as a configuration in which the removable grip-assistance component 306 is rigidly attached to a railing 302. In such a configuration where the removable grip-assistance component 306 is rigidly attached to a railing 302, a rotational sensor embedded in the removable grip-assistance component 306 may output one or more rotational orientation values 310 indicative of an extent to which the railing 302 has rotated in response to deflection of the railing 302, the railing 302 assembly, and/or any other object or system to which the railing 302 is attached (e.g., an elevated work surface 304, a vehicle, a structural component of a building, a crib, and/or the like).

In some examples, the system includes a sensor 210-*b* configured to output a pressure value 312 indicative of a stability of the user, wherein the one or more processors 202 are configured to cause the safety-based action to be performed based at least in part on (i) the rotational orientation value 310 satisfying the threshold rotational orientation value and (ii) the pressure value 312 satisfying a threshold pressure value.

In some examples, a pressure value 312 is a value that is output by a force sensor (e.g., a sensor 210-*b*). A pressure value 312 may be indicative of a weight of a user, a weight distribution of a user, and/or a force exerted by a user (e.g., a force exerted on a force sensor, which may be coupled with a railing 302, an elevated work surface 304, a removable grip-assistance component 306, a removable mat component 308, and/or the like). In some examples, a pressure value 312 may indicate a balance and/or stability of a user on a surface, such as an elevated work surface 304. For example, a pressure value 312 may decrease or go to zero, which may indicate that a user has lifted one or more feet off of a work surface (e.g., to balance on a single foot). Additionally, or alternatively, a pressure value 312 and/or signal representative of the pressure value 312 may fluctuate in magnitude (e.g., beyond a threshold fluctuation magnitude), which may indicate that a user is unsteady or otherwise making dangerous movements.

In some examples, a pressure value 312 may indicate whether a user has exerted a force on a railing 302, a removable grip-assistance component 306, and/or the like. For example, a user may lean onto or place a hand on a removable grip-assistance component 306, which may cause a pressure sensor (e.g., a sensor 210) embedded in the removable grip-assistance component 306 to output one or more values indicative of a quantity of force applied to the removable grip-assistance component 306 by the user. As described herein, one or more pressure values 312 may be communicated to one or more processors 202. The one or more processors 202 may then determine whether the one or more pressure values 312 have satisfied (e.g., exceeded) one or more pressure value thresholds. If the one or more pressure values 312 have satisfied the one or more pressure value thresholds, the one or more processors 202 may cause one or more safety-based actions to be performed.

In some examples, the system includes a removable mat component 308 in contact with an elevated work surface 304, wherein the removable mat component 308 comprises a sensor 210-*b* configured to output a pressure value 312. In some examples, a removable mat component 308 is a component or device that may be coupled with a surface, such as an elevated work surface 304. In some examples, a removable mat component 308 may be placed onto a horizontal surface where a user may stand, sit, or lie. In some examples, the removable mat component 308 may be rigidly attached to the surface. In some examples, the removable mat component 308 may include one or more sensors 210. The one or more sensors 210 (e.g., force sensors, pressure sensors, weight sensors) may be embedded in the removable mat component 308 and/or attached to an underside of the removable mat component 308. In either configuration, the one or more sensors 210 may detect one or more forces exerted on the removable mat component 308, which may be indicative of a location of a user, a balance of a user, a stance of a user (e.g., whether the user is standing on one or two legs), and/or the like.

In some examples, an elevated work surface 304 refers to a surface that physically supports one or more users. For example, a cherry picker and/or industrial scissor lift may include an elevated work surface 304, which one or more users may stand on while completing one or more tasks in a position that is above a ground level. In some examples, a removable mat component 308 may be placed onto or otherwise rigidly coupled with an elevated work surface 304. In some examples, an elevated work surface 304 may be horizontal. However, in some examples, an elevated work surface 304 may be configured to tilt or otherwise change its orientation in response to user control inputs. Although some examples described herein refer to removable mat components 308 being placed on elevated work surfaces 304, removable mat components 308 may be deployed in any other context without loss of meaning. For example, a removable mat component 308 may be placed on platform within a crib, on a floor that is near or otherwise adjacent to a railing 302, on a surface of a vehicle (e.g., on the deck of a boat near a railing 302), and/or the like.

In some examples, the rotational orientation value 310 associated with the railing 302 is indicative of a rotation of a removable grip-assistance component 306. In some examples, the rotational orientation value 310 associated with the railing 302 is indicative of a rotation of the railing 302. In some examples, the system includes a retractable safety net 314, wherein the safety-based action comprises deploying the retractable safety net 314.

In some examples, a retractable safety net 314 is a net or fall prevention device that is configured to prevent a user from falling or otherwise reduce harm to a user associated with a fall. A retractable safety net 314 may be configured to extend or to otherwise be deployed in response to one or more criteria being satisfied. For example, a retractable safety net 314 may be deployed if one or more sensors 210 output one or more values that satisfy a threshold value. In some examples, a retractable safety net 314 may be mounted a device, such as an elevated work surface 304, a crib, a vehicle, a building, and/or the like. In one example, a retractable safety net 314 may be mounted to an edge of an elevated work surface 304.

In some examples, a retractable safety net 314 may be deployed via a safety net deployment system. The safety net deployment system may include one or more telescoping frame components that extend, spread, or otherwise deploy the retractable safety net 314. In some examples, the safety net deployment system may include one or more mounting devices for attaching the retractable safety net 314 to a device or component of a system (e.g., an edge of an elevated work surface 304).

In some examples, the system includes an auditory alert component 316, wherein the safety-based action comprises providing an alert tone via the auditory alert component 316. In some examples, an auditory alert component 316 is a device or component that is configured to output one or more auditory alerts. In some examples, an auditory alert component 316 may be in communication with one or more processors 202. In such examples, the one or more processors 202 may communicate one or more signals to the auditory alert component 316, which may cause the auditory alert component 316 to emit one or more auditory alerts. An auditory alert may serve to notify one or more users and/or one or more bystanders that a fall or accident is impending. In some examples, an auditory alert may serve to notify one or more users and/or one or more bystanders that a fall has occurred. Although some examples described herein refer to an auditory alert component 316 outputting one or more auditory alerts, it should be understood that a visual alert component may additionally, or alternatively be utilized to output one or more visual alerts (e.g., one or more flashing lights may indicate that a fall is about to occur).

In some examples, the safety-based action comprises providing a message 318 to an emergency response professional indicating that the user has fallen. In some examples, a message 318 is a text and/or audio communication which may be transmitted to one or more individuals. In some examples, a communication component may be utilized to transmit a message 318. For example, one or more processors 202 may transmit a signal to a communication component. The communication component may then transmit a message 318 to one or more individuals (e.g., via one or more computing devices, via one or more external computing devices) in response to receiving the signal from the one or more processors 202. In some examples, a message 318 may include an indication that a fall has occurred or an indication that a fall is imminent.

Figure 4:
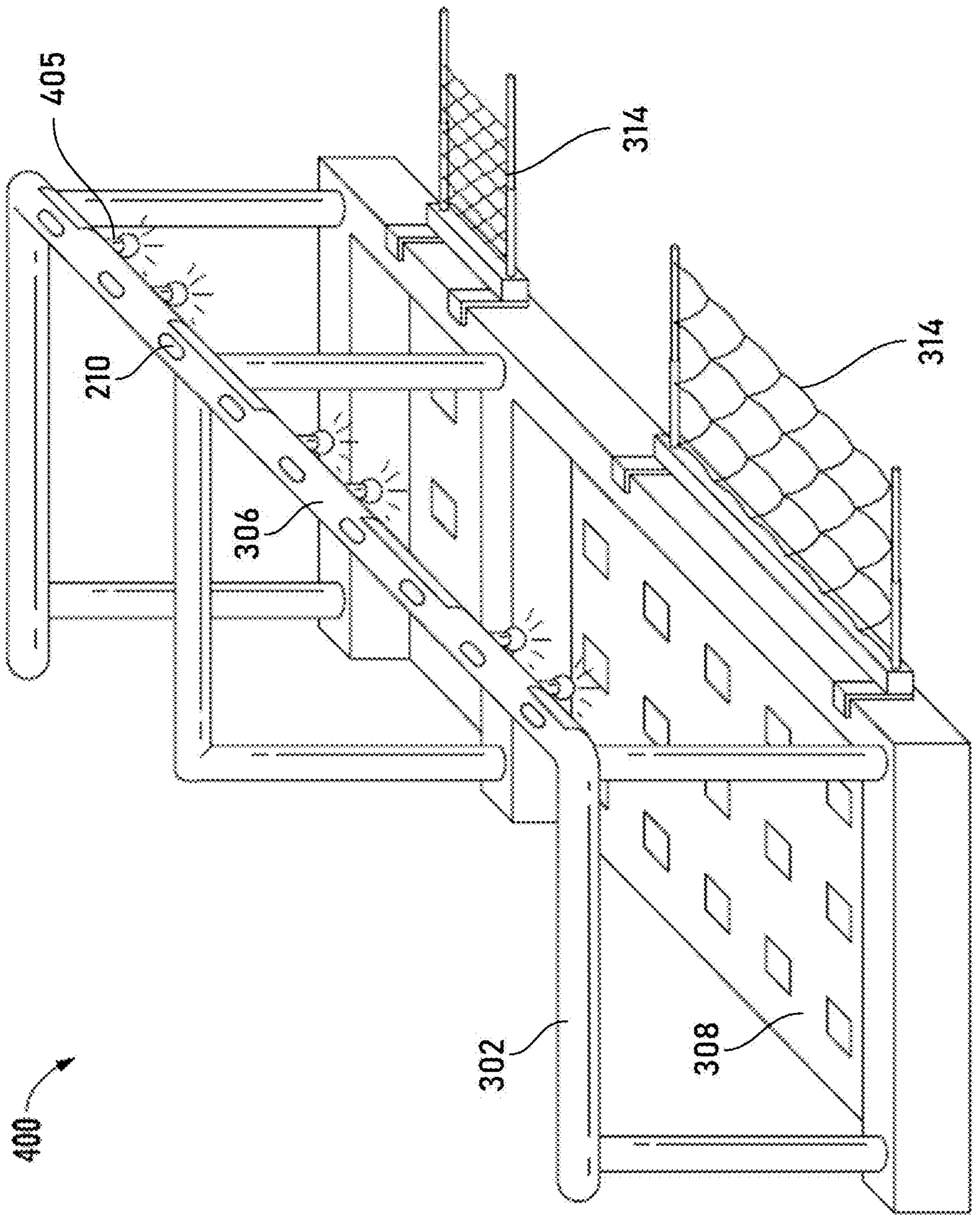
FIG. 4 is an operational example of a system that supports detecting falls using rotation-based sensing in accordance with one or more embodiments of the present disclosure.

FIG. 4 is an operational example 400 of a system that supports detecting falls using rotation-based sensing in accordance with one or more embodiments of the present disclosure. The system may include one or more removable mat components 308 placed onto or otherwise coupled with the one or more elevated work surfaces, one or more railings 302, one or more removable grip-assistance components 306 placed onto or otherwise coupled with the one or more railings 302, one or more retractable safety nets 314, one or more brace components that secure the one or more retractable safety nets 314 to the elevated work surface, one or more visual alert components 405 (e.g., flashing lights), one or more sensors 210, or any combination thereof. Although some examples described herein refer to retractable safety nets 314, any type of fall prevention device may be used, such as one or more telescoping plates and/or telescoping cross beams. In some examples, although not shown in FIG. 4, the system may include one or more auditory alert components 316.

As described herein, the system may be configured to prevent or otherwise reduce the severity of falls by utilizing any one or more sensors 210, which may be associated with, embedded in, or otherwise attached to one or more removable mat components 308 and/or one or more removable grip-assistance components 306. For example, a removable grip-assistance component 306 may include or otherwise be coupled with one or more pressure sensors, one or more gyroscopic sensors, one or more accelerometers, or any combination thereof. Additionally, or alternatively, a removable mat component 308 may include or otherwise be coupled with one or more pressure sensors, one or more gyroscopic sensors, one or more accelerometers, or any combination thereof.

In some examples, one or more accelerometers may be coupled with the railing 302. The one or more accelerometers may output one or more acceleration values, which may be received by one or more processors. The one or more processors may then determine if the one or more acceleration values satisfy (e.g., are greater than or equal to) one or more threshold acceleration values, which may indicate that a fall may occur and/or that an unsafe condition exists. For example, a worker that bumps into the railing 302 may cause the one or more accelerometers to output one or more acceleration values that satisfy the one or more threshold acceleration values. As another illustrative example, one or more acceleration values that satisfy the one or more threshold acceleration values may indicate that the railing 302 is unstable or not securely attached to an elevated work surface. In response to detecting such a condition, the one or more processors may cause one or more individuals (e.g., emergency response individuals, maintenance staff) to be alerted that the railing 302 is unstable or otherwise in need of servicing. In some examples, one or more pressure sensors may be coupled with the railing 302, which may be utilized in a similar fashion to the one or more accelerometers. For example, if the one or more pressure sensors output one or more pressure values that satisfy one or more threshold pressure values, one or more processors may cause one or more safety-based actions to be performed.

Figure 5:
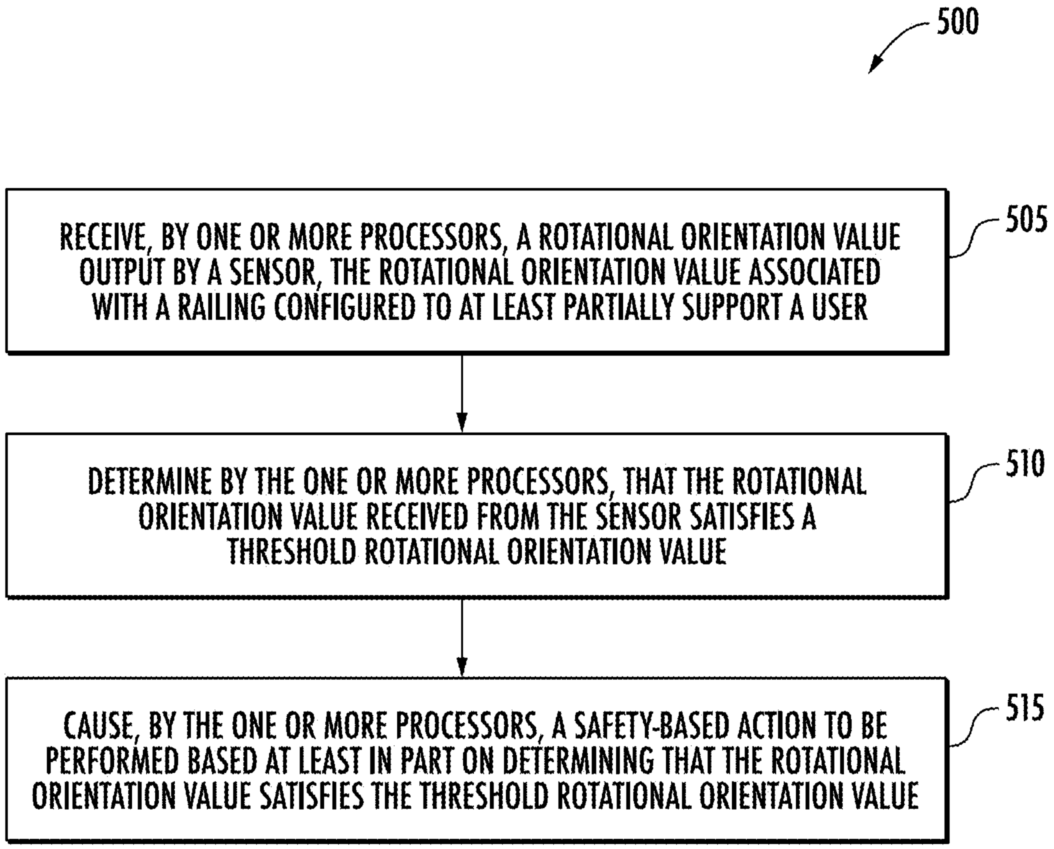
FIG. 5 is an operational example of a process that supports detecting falls using rotation-based sensing in accordance with one or more embodiments of the present disclosure.

FIG. 5 is an operational example 500 of a process that supports detecting falls using rotation-based sensing in accordance with one or more embodiments of the present disclosure. Specifically, FIG. 5 depicts operations of the process. In some embodiments, the process is embodied by computer program code stored on a non-transitory computer-readable storage medium of a computer program product configured for execution to perform the process as depicted and described. Additionally, or alternatively, in some embodiments, the process is performed by at least one specially configured computing device, such as at least one computing device 200 alone or in communication with at least one other component, device, system, and/or the like.

In this regard, in some such embodiments, the computing device 200 is specially configured by computer-coded instructions (e.g., computer program instructions) stored thereon, for example in the memory 204 and/or another component depicted and/or described herein and/or otherwise accessible to the computing device 200, for performing the operations as depicted and described. In some embodiments, the computing device 200 is in communication with at least one external apparatus, system, device, and/or the like, to perform at least one of the operations as depicted and described. For example, the computing device 200, in some embodiments, is in communication with an external computing device, a client device, and/or the like. For purposes of simplifying the description, the process is described as performed by and from the perspective of the computing device 200.

The process begins at operation 1305. At operation 1305, the computing device 200 includes means such as the sensors 210, communications circuitry 208, input/output circuitry 206, one or more processors 202, input/output circuitry 206, or a combination thereof, to receive a rotational orientation value output by a sensor, the rotational orientation value associated with a railing configured to at least partially support a user.

At operation 1310, the computing device 200 includes means such as the sensors 210, communications circuitry 208, input/output circuitry 206, one or more processors 202, input/output circuitry 206, or a combination thereof, to determine that the rotation orientation value received from the sensor satisfies a threshold rotational orientation value.

At operation 1315, the computing device 200 includes means such as the sensors 210, communications circuitry 208, input/output circuitry 206, one or more processors 202, input/output circuitry 206, or a combination thereof, to cause a safety-based action to be performed based at least in part on determining that the rotational orientation value satisfies the threshold rotational orientation value.

CONCLUSION

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

In some embodiments, some of the operations above may be modified or further amplified. Furthermore, in some embodiments, additional optional operations may be included. Modifications, amplifications, or additions to the operations above may be performed in any order and in any combination.

Although an example processing system has been described above, implementations of the subject matter and the functional operations described herein can be implemented in other types of digital electronic circuitry, or in computer software, firmware, or hardware, including the structures disclosed in this specification and their structural equivalents, or in various combinations.

Embodiments of the subject matter and the operations described herein can be implemented in digital electronic circuitry, or in computer software, firmware, or hardware, including the structures disclosed in this specification and their structural equivalents, or in various combinations. Embodiments of the subject matter described herein can be implemented as at least one computer program, i.e., at least one module of computer program instructions, encoded on computer storage medium for execution by, or to control the operation of, information/data processing apparatus. Alternatively, or in addition, the program instructions can be encoded on an artificially generated, propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination. Moreover, while a computer storage medium is not a propagated signal, a computer storage medium can be a source or destination of computer program instructions encoded in an artificially generated, propagated signal. The computer storage medium can also be, or be included in, at least one separate physical component or media (e.g., multiple CDs, disks, or other storage devices).

The operations described herein can be implemented as operations performed by an information/data processing apparatus on information/data stored on at least one computer-readable storage device or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or any combination thereof. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., at least one script stored in a markup language document), in a single file dedicated to the program in question, or in multiple coordinated files (e.g., files that store at least one module, sub-program, or portion of code). A computer program can be deployed to be executed on one computer or on multiple computers that are located at one site or distributed across multiple sites and interconnected by a communication network.

The processes and logic flows described herein can be performed by at least one programmable processor executing at least one computer program to perform actions by operating on input information/data and generating output. Processors suitable for the execution of a computer program include, by way of example, both general and special purpose microprocessors, and any processor of any kind of digital computer. Generally, a processor will receive instructions and information/data from a read-only memory or a random access memory or both. The essential elements of a computer are a processor for performing actions in accordance with instructions and at least one memory device for storing instructions and data. Generally, a computer will also include, or be operatively coupled to receive information/data from or transfer information/data to, or both, at least one mass storage device for storing data, e.g., magnetic, magneto-optical disks, or optical disks.

However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of at least one such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, at least one feature from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:

a railing configured to at least partially support a user;

a sensor configured to output a rotational orientation value associated with the railing;

a removable grip-assistance component in contact with the railing, the removable grip-assistance component comprising the sensor; and one or more processors in communication with the sensor, the one or more processors configured to:

receive the rotational orientation value from the sensor;

determine that the rotational orientation value received from the sensor satisfies a threshold rotational orientation value; and cause a safety-based action to be performed based at least in part on determining that the rotational orientation value satisfies the threshold rotational orientation value.

2. The system of claim 1, wherein the sensor comprises a gyroscopic sensor.

3. The system of claim 1, further comprising:

a second sensor configured to output a pressure value indicative of a stability of the user, wherein the one or more processors are configured to cause the safety-based action to be performed based at least in part on (i) the rotational orientation value satisfying the threshold rotational orientation value and (ii) the pressure value satisfying a threshold pressure value.

4. The system of claim 1, further comprising:

a second sensor configured to output an acceleration value indicative of an acceleration of the railing, wherein the one or more processors are configured to cause the safety-based action to be performed based at least in part on (i) the rotational orientation value satisfying the threshold rotational orientation value and (ii) the acceleration value satisfying a threshold acceleration value.

5. The system of claim 1, further comprising:

a removable mat component in contact with an elevated work surface, wherein the removable mat component comprises a second sensor configured to output a pressure value.

6. The system of claim 1, wherein the rotational orientation value associated with the railing is indicative of a rotation of a removable grip-assistance component.

7. The system of claim 1, wherein the rotational orientation value associated with the railing is indicative of a rotation of the railing.

8. The system of claim 1, further comprising:

a retractable safety net, wherein the safety-based action comprises deploying the retractable safety net.

9. The system of claim 1, further comprising:

an auditory alert component, wherein the safety-based action comprises providing an alert tone via the auditory alert component.

10. The system of claim 1, wherein the safety-based action comprises providing a message to an emergency response professional indicating that the user has fallen.

11. The system of claim 1, wherein the railing is coupled with (i) an elevated work surface, (ii) a building, (iii) a vehicle, or (iv) a crib.

12. A method comprising:

receiving, by one or more processors, a rotational orientation value output by a sensor, the rotational orientation value associated with a railing configured to at least partially support a user;

determining, by the one or more processors, that the rotational orientation value received from the sensor satisfies a threshold rotational orientation value; and causing, by the one or more processors, a safety-based action to be performed based at least in part on determining that the rotational orientation value satisfies the threshold rotational orientation value, wherein the rotational orientation value associated with the railing is indicative of a rotation of a removable grip-assistance component.

13. The method of claim 12, further comprising:

receiving, by the one or more processors, a pressure value indicative of a stability of the user, wherein the one or more processors cause the safety-based action to be performed based at least in part on (i) the rotational orientation value satisfying the threshold rotational orientation value and (ii) the pressure value satisfying a threshold pressure value.

14. The method of claim 12, wherein the rotational orientation value associated with the railing is indicative of a rotation of the railing.

15. The method of claim 12, wherein the safety-based action comprises deploying a retractable safety net.

16. The method of claim 12, wherein the safety-based action comprises providing an alert tone.

17. The method of claim 12, wherein the safety-based action comprises providing a message to an emergency response professional indicating that the user has fallen.

* * * * *